United States Patent
Ogui

[11] 3,795,225
[45] Mar. 5, 1974

[54] ENCLOSED FISHBOWL

[76] Inventor: William M. Ogui, 1210 Stratford Ave., Apt. 9B, Bronx, N.Y. 10472

[22] Filed: Mar. 16, 1973

[21] Appl. No.: 341,894

[52] U.S. Cl. .................................. 119/5, 210/169
[51] Int. Cl. ........................................... A01k 63/00
[58] Field of Search ..................... 119/5, 3; 210/169

[56] References Cited
UNITED STATES PATENTS

| | | | |
|---|---|---|---|
| 1,965,323 | 7/1934 | Taslitt | 119/5 X |
| 2,286,146 | 6/1942 | Look | 119/5 X |
| 2,888,205 | 5/1959 | Trucco | 119/5 X |
| 3,185,829 | 5/1965 | Rau | 119/5 X |
| 3,146,195 | 8/1964 | Berardi | 119/5 X |

*Primary Examiner*—Hugh R. Chamblee
*Attorney, Agent, or Firm*—Albert F. Kronman

[57] ABSTRACT

An ornamental fish bowl closed on all sides and including a water pump with an aspirator for circulating the water and adding small air bubbles to it. The water is directed through an aspirator and a filter for removing suspended solids, then through a first screen to an annular space where the fish are confined. A second screen permits water to be drawn from the annular space and directed to the entrance pipe of the water pump.

9 Claims, 4 Drawing Figures

PATENTED MAR 5 1974

ENCLOSED FISHBOWL

BACKGROUND OF THE INVENTION

Aquariums with water pumps and air jet devices are old in the art and have been used for some time. Generally, two pumps are required, one for circulating the water and another for adding fine streams of air bubbles to the water at or near the bottom of the tank. The present invention uses a single mechanical pump to circulate the water and force it through an aspirator nozzle to draw air into a mixing chamber and thereby aerate the water.

The present invention employs a transparent container with an ornamental shape, closed at the top with a flat circular disk, and providing a large annular space for the fish. A central space includes an aspirator, a filter, and a water pump to provide the necessary circulation and purification means. A portion of the bowl system is open to the atmosphere so that food can be added to the water and additional water can be added to replenish the amount lost by evaporation.

One of the features of the invention is the function of the aspirator which draws air from the outside atmosphere and mixes it with water.

Another feature of the invention is the circulating system which forces all the water through compartments which include the fish space and the filtering means.

Still another feature of the invention is a compound jet pump which mixes air with the water and at the same time produces the fluid energy which circulates the water through the system.

Other features and additional details of the invention will be disclosed in the following description, taken in connection with the accompanying drawings.

DESCRIPTION OF THE PREFERRED EMBODIMENT

Figure 1:
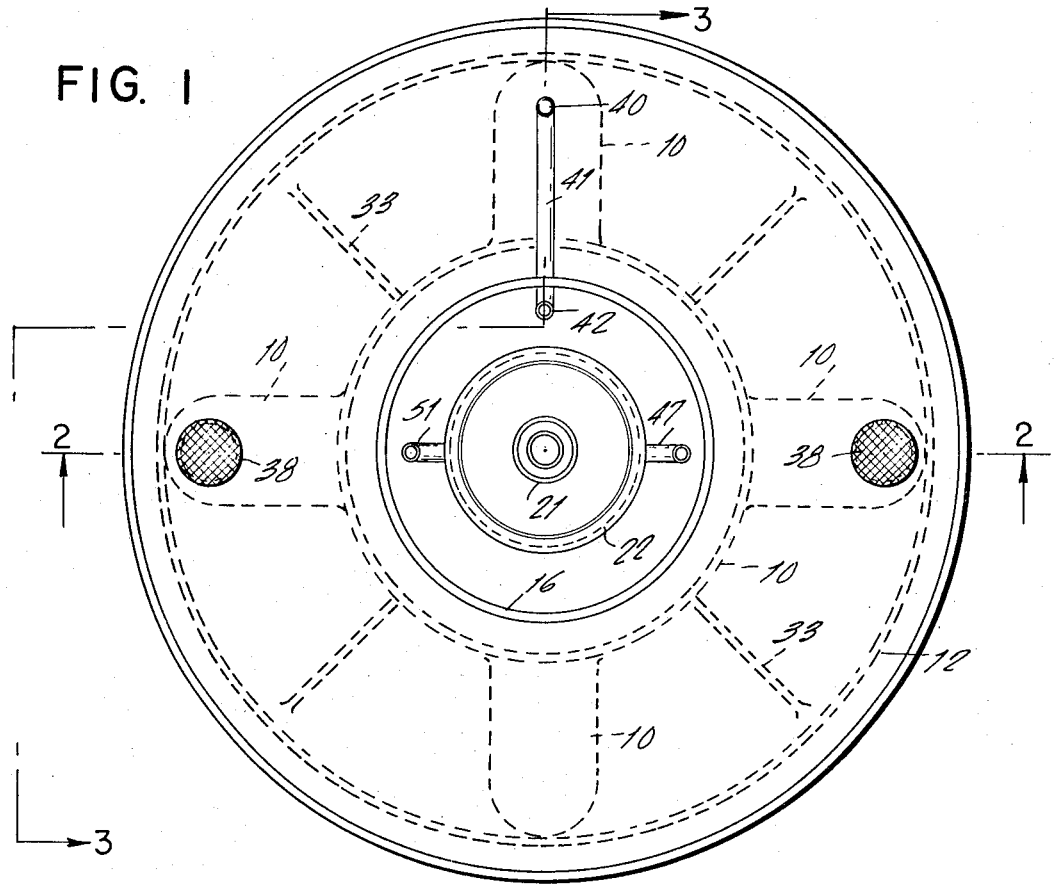
FIG. 1 is a plan view of the fish bowl with the cover removed, showing the positions of the two screens, the filter, and the aspirator.

Referring now to the figures, the fish bowl assembly includes a base with four legs 10, a cylindrical support 11, and an annular compartment 12 for water and fish. The top of the annular space 12 is covered with a transparent cover disk 13 which is provided with sealing means 14 at its periphery and additional sealing means 15 to seal off a central area.

Within cylinder 11 there is another cylinder 16 which fits into a circular groove 17 at its lower edge and is formed integral with the annular compartment 12. Cylinder 16 houses an electric motor 18, a water pump 20, and a compound aspirator 21 which mixes air with the water. Directly above the aspirator 21 is a filtering container 22 supported on the outer casing 23 of the aspirator 21. The container 22 includes a bottom portion formed with a plurality of holes 24, an inner porous insert 25 which can be removed after extended use, and an outer cylindrical wall 26, also formed with holes 27. A quantity of small stones 28 are placed within container 22 to catch the larger solid particles filtered from the water circulated by pump 20. The container 22 is removable from the cylinder 23 and normally rests on flange 30 secured to cylinder 23.

The annular compartment 12 is also supported by a generally cup-shaped ring 31, turned up at its outer periphery to hold the said compartment 12, and turned down at its inner edge to make a water proof seal 32 with the top of cylinder 11. The seal 32 is conveniently made of a strip of rubber or plastic doubled around the edge of ring 31 and supported by a channel formed at the top edge of cylinder 11. Ring 31 is formed with a plurality of stiffening ribs 33 to add strength and rigidity to the system.

Figure 3:
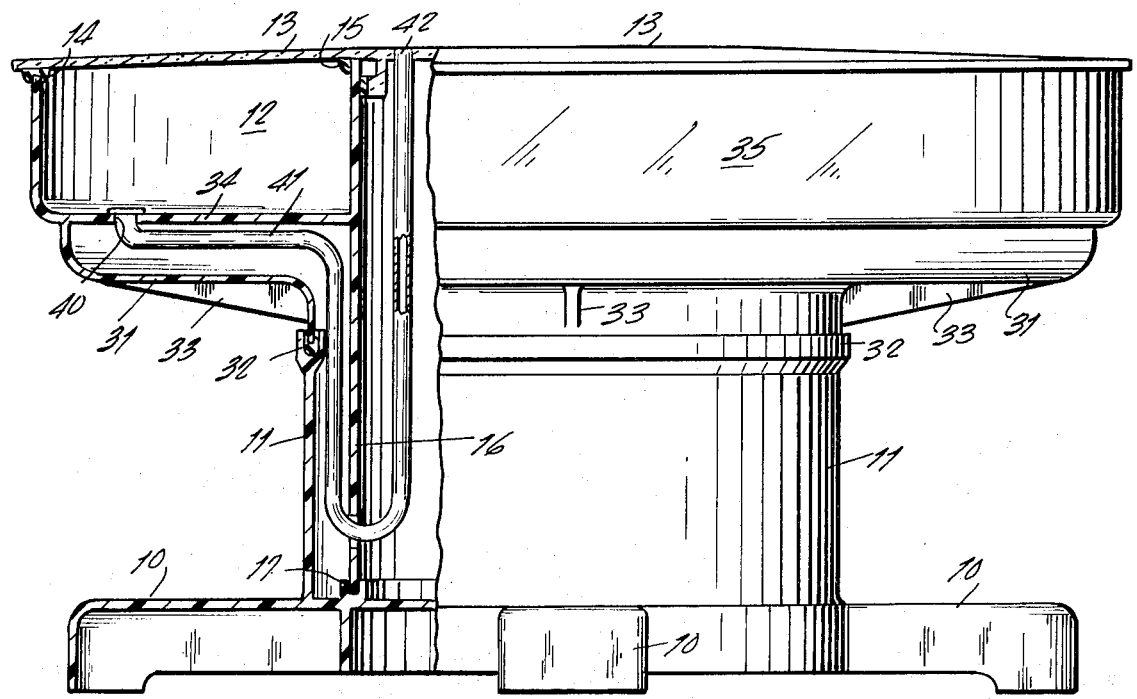
FIG. 3 is a side view of the bowl with some parts shown in section, showing the ornamental features and the tube through which water and food are added to the bowl.

The bottom of the annular space 12 consists of a flat plate 34 formed integral with or sealed to the side cylinders 16 and 35. An entrance port 36 is formed in plate 34 on one side of the compartment and an exit port 37 is located on the other side. Both ports are covered with fine mesh screens 38 to keep the fish in their compartment. A third opening 40 (see FIG. 3) is formed in ring 34 and joined to a conduit 41 which is bent into a U-shape to fit between cylinders 11 and 16 and then connect with another opening 42 in the cover disk 13. As stated above, this tube permits the entrance of water and food into the fish bowl system.

Figure 4:
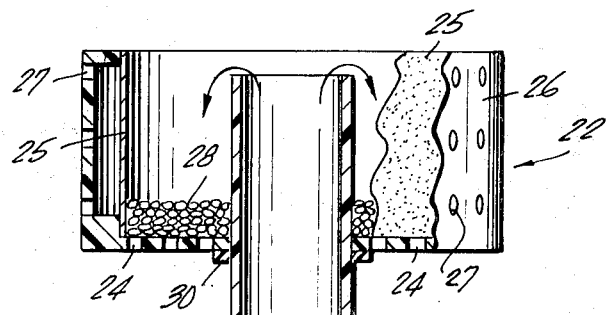
FIG. 4 is a cross sectional view of the jet and filtering system in greater detail.
Figure 4:
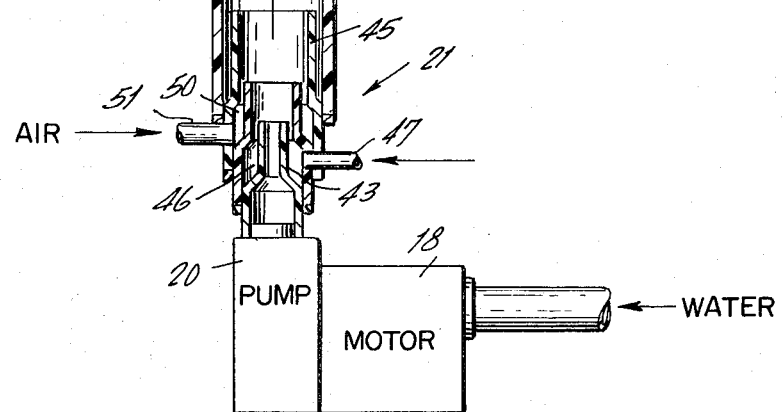

A jet aspirator 21 is mounted in axial alignment with the bowl and directly above the water pump 20. Water from the pump is forced through a first nozzle 43 (see FIG. 4), then through a second nozzle 44, and finally through a third nozzle 45, into the vertical casing 23. Water forced through the first nozzle 43 creates a reduced pressure in the space 46 around the nozzle and this reduced pressure draws air or water through pipe 47 in communication with space 48, to lower the pressure in the circular space 48 and force the central portion of the cover down on the upper edge of cylinder 16.

Figure 2:
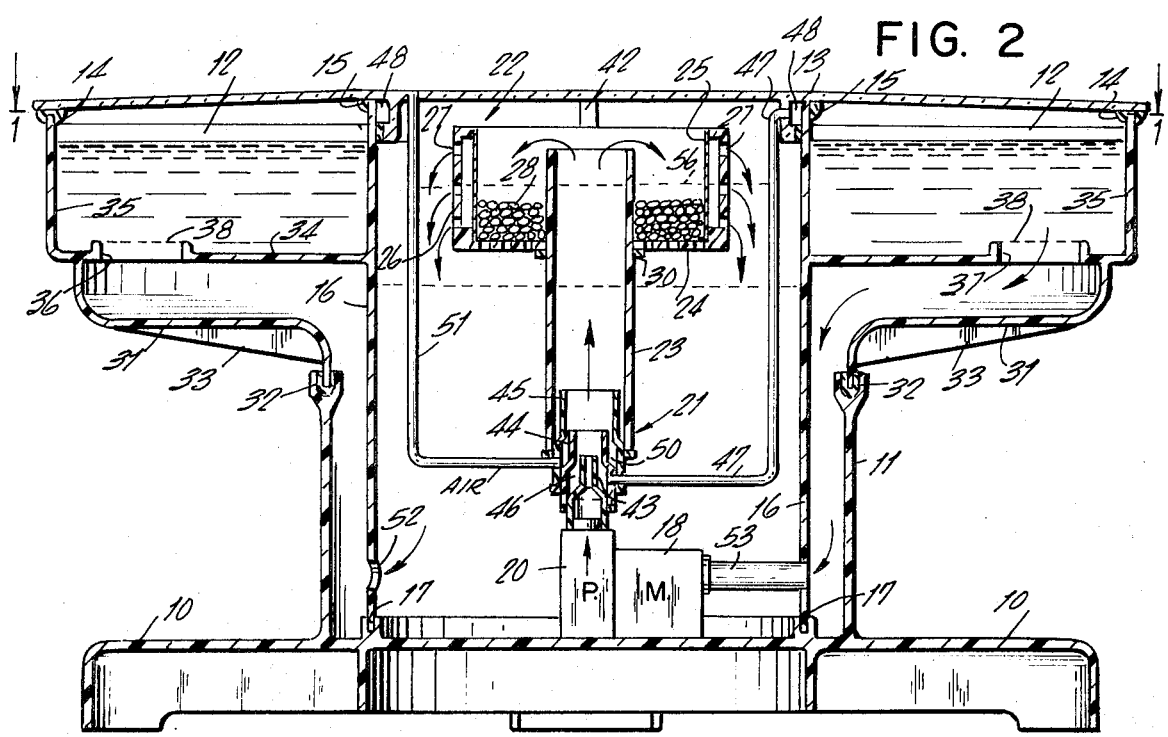
FIG. 2 is a cross sectional view of the bowl shown in FIG. 1 and is taken along line 2—2 of that figure.

Water forced through the second nozzle 44 creates a reduced pressure in the space 50 around the nozzle and draws air through pipe 51 which is connected to the outside atmosphere through a hole in the top cover. The reduced pressure draws air into space 50 and air and water are mixed in the nozzle 45 and sent up to the filter space where it drains through the stones 28 and drips through holes 24. After leaving the filter, the water and entrapped air drop down to the base portion and then move through hole 52 (FIG. 2) into the space between cylinders 11 and 16. The force of the water stream and the reduced pressure at the top surface draw the water up through screen 38 over hole 36 and into the fish compartment 12. Pump 20 receives its water from pipe 53, the space between cylinder walls 11 and 16, and sieve 39 over port 37. In this manner, the water is circulated through the fish compartment 12 and, at the same time, air is added to the water in fine bubbles to purify it. The excess air, which is separated from the water while passing through the filter, escapes through a hole 54 in the top cover 13. The normal level of water in the central space is shown by dotted line 55 (FIG. 2). If, for any reason, the motor 18 and pump 20 are stopped, the level of water in the central space rises to the level indicated by dotted line 56, giving the fish enough water to survive until the pump is started again.

Having thus fully described the invention, what is claimed as new and desired to be secured by Letters Patent of the United States is:

1. An enclosed water container for use as a fish bowl and including water circulating means comprising: a liquid retaining base for supporting all the container components; an annular compartment filled with water and supported by the base for accommodating fish; a cylindrical central enclosure connected to the annular compartment for housing parts of the circulating means; a water pump powered by an electric motor in said enclosure; a first aspirator connected to the pump for reducing the pressure in the annular compartment; a second aspirator connected to the first for adding bubbles of air from the atmosphere to the water; a water filter coupled to said aspirators for removing solids from the circulating water; and conduit connecting means between the components in said central enclosure for directing the circulating water through said components and the annular compartment.

2. A container according to claim 1 wherein said annular compartment includes a cover plate which is made of transparent plastic material.

3. A container according to claim 2 wherein said cover plate is generally flat and is secured to the annular compartment by means of resilient water tight seals.

4. A container according to claim 1 wherein the first aspirator comprises a nozzle positioned adjacent to a constricted conduit, the annular space surrounding said nozzle being connected to the top portion of the annular compartment for reducing the pressure therein.

5. A container according to claim 1 wherein the second aspirator is mounted above the first and in axial alignment therewith, the second aspirator comprising a nozzle positioned adjacent to a constricted conduit, the annular space surrounding said nozzle being connected to the outside air for drawing air into the second aspirator and mixing air bubbles with the water.

6. A container according to claim 5 wherein said second aspirator is connected by a conduit to an opening in the cover plate.

7. A container according to claim 1 wherein said water filter includes a removable receptacle positioned around a casing connected to said second aspirator, said receptacle including a quantity of small particles.

8. A container according to claim 1 wherein a hollow cylindrical support is positioned around the central enclosure, thereby forming a cylindrical space in axial alignment with said first and second nozzles for forming conduits therebetween to direct the flow of water into and out of the annular compartment.

9. A container according to claim 1 in which the cover plate is formed with an opening to receive one end of a conduit the other end of which is in communication with the interior of the annular compartment.

* * * * *